July 31, 1945.  C. J. WHITACRE  2,380,814
BRAKING MECHANISM
Filed Dec. 23, 1943  3 Sheets-Sheet 1

INVENTOR
C. J. WHITACRE

BY

ATTORNEY

July 31, 1945.    C. J. WHITACRE    2,380,814
BRAKING MECHANISM
Filed Dec. 23, 1943    3 Sheets-Sheet 3

INVENTOR
C. J. WHITACRE

BY    *C. O. Huffman*
ATTORNEY

Patented July 31, 1945

2,380,814

UNITED STATES PATENT OFFICE 2,380,814

BRAKING MECHANISM

Clarence J. Whitacre, St. Louis, Mo., assignor to Wagner Electric Corporation, St. Louis, Mo., a corporation of Delaware Application December 23, 1943, Serial No. 515,334

9 Claims. (Cl. 188—78)

My invention relates to braking mechanism and more particularly to an improved brake assembly in which a self-energized automatically self-centered brake shoe is employed.

One of the objects of my invention is to produce a brake assembly which embodies improved mounting and actuating means for a self-centering brake shoe whereby said shoe can act as a self-energized shoe in both directions of drum rotation.

Another object of my invention is to produce an improved brake assembly in which two self-centering brake shoes and actuating means therefor are so embodied in said assembly that both shoes will act as "forward" shoes in one direction of drum rotation and as "forward" and "reverse" shoes in the other direction of drum rotation.

Yet another object of my invention is to produce a brake assembly in which self-centering shoes are so mounted and actuated that improved braking action will be present.

Figure 1:
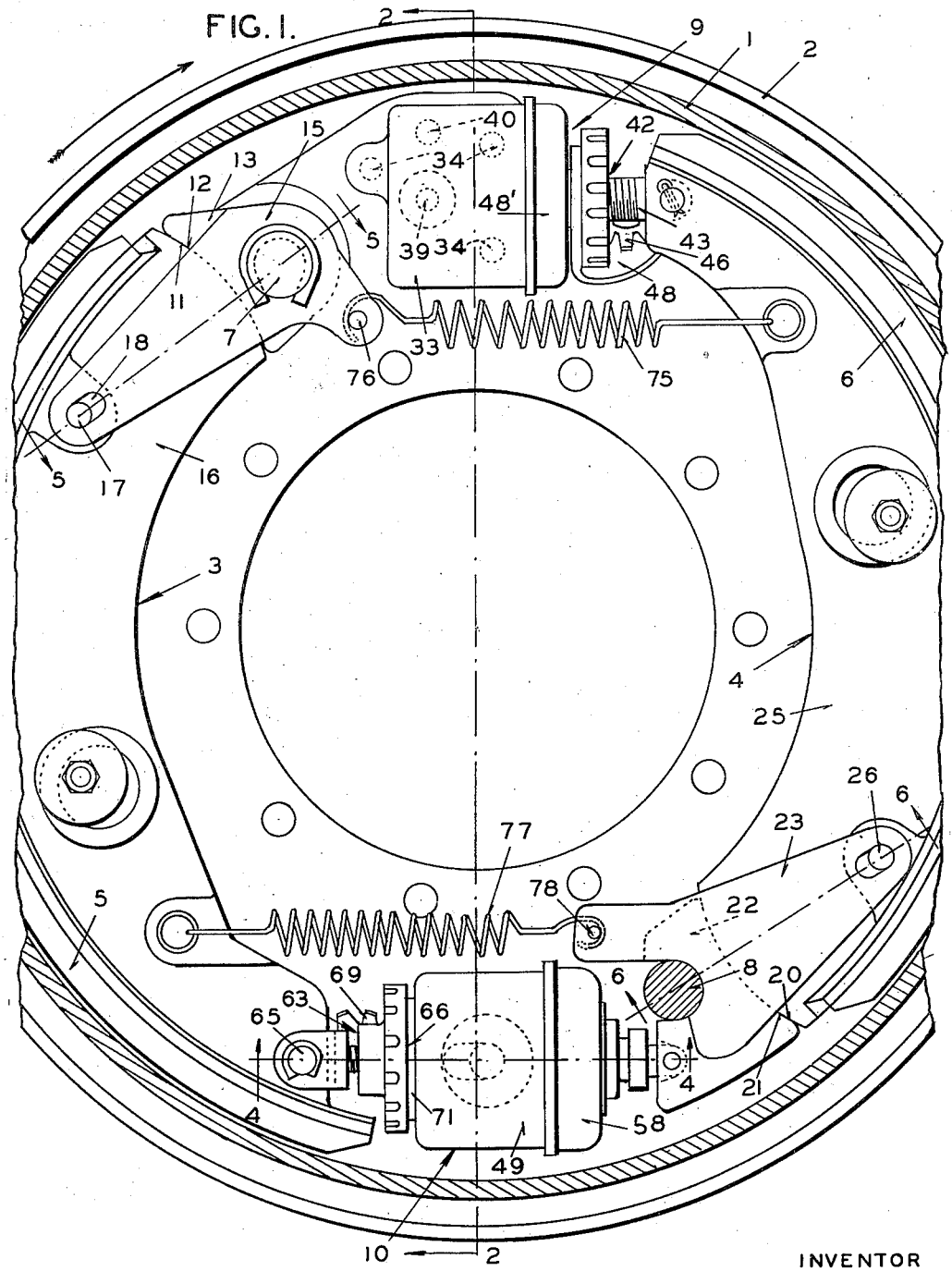
Figure 2:
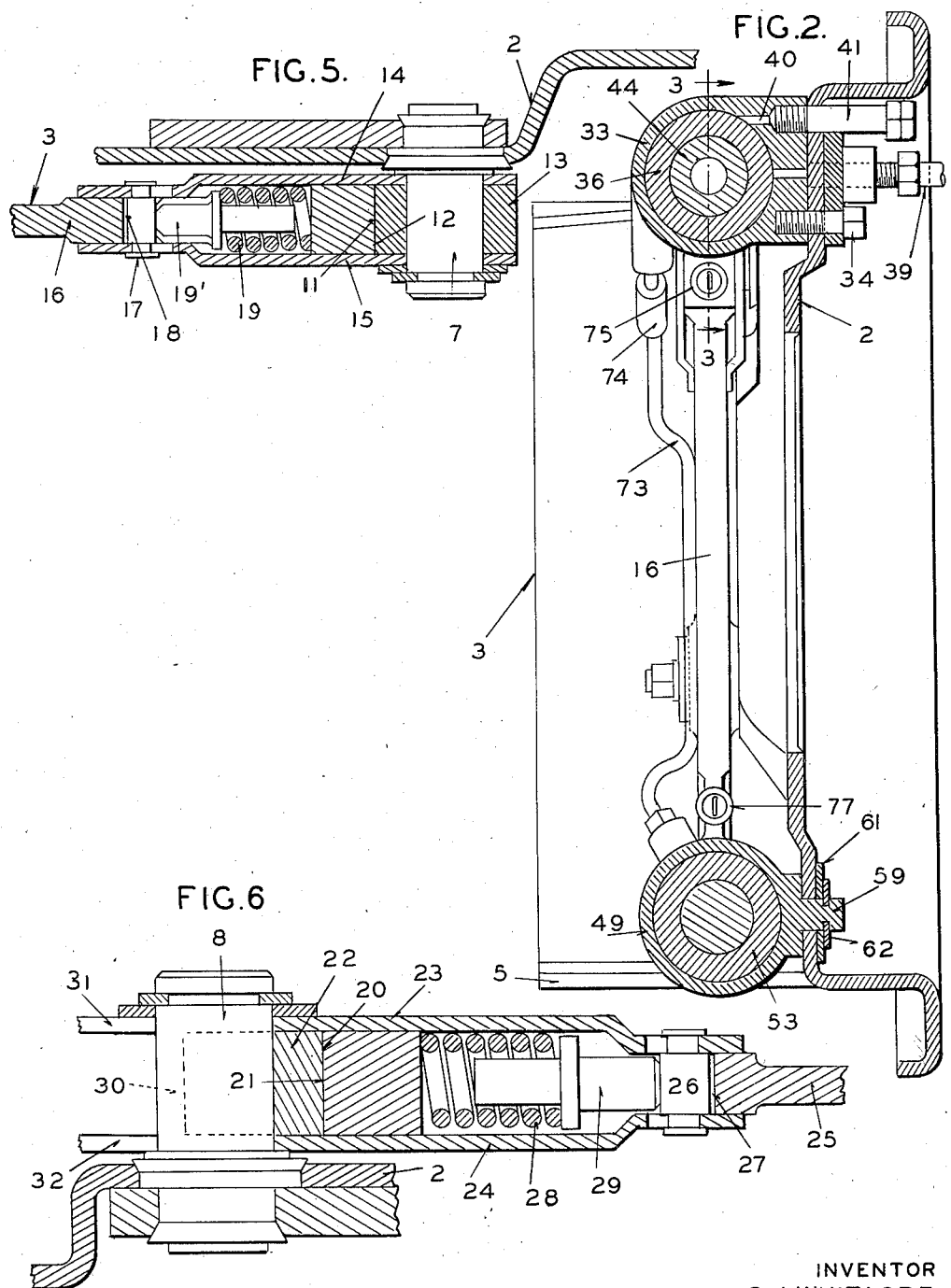
Figure 3:
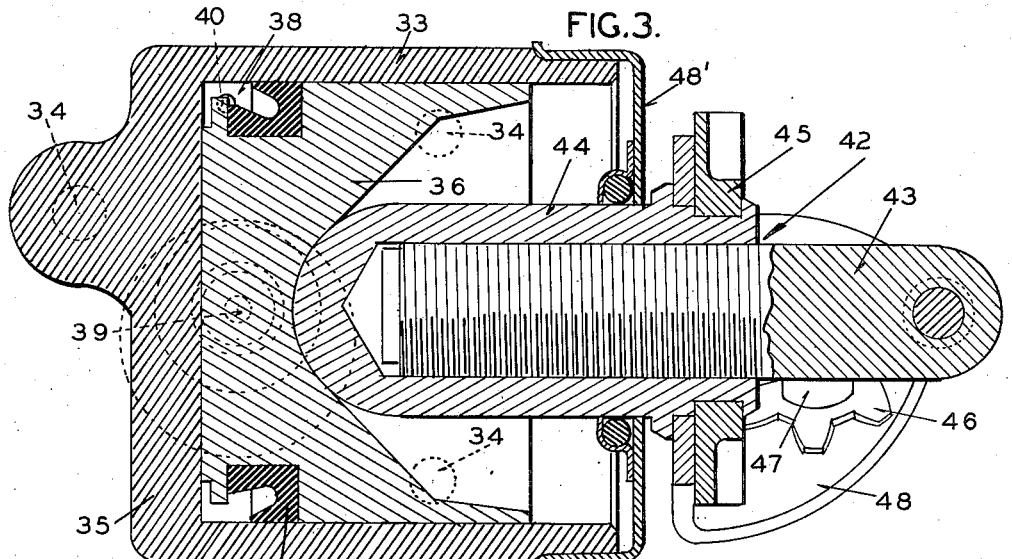
Figure 4:
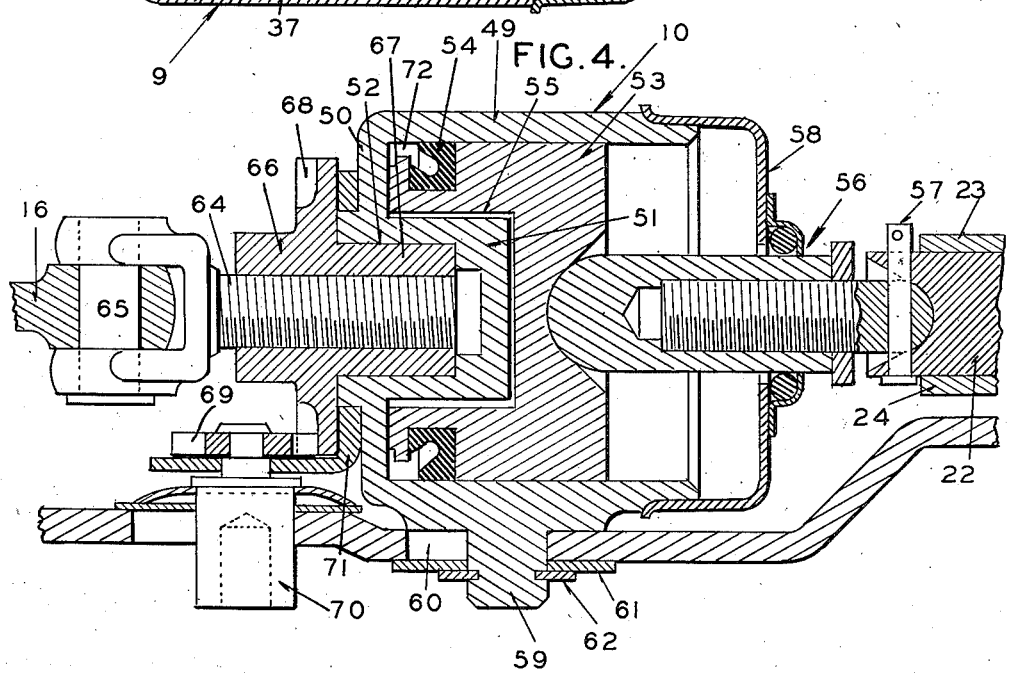

Other objects of my invention will become apparent from the following description taken in connection with the accompanying drawings in which Figure 1 is a side view of a brake assembly embodying my invention, the drum being shown in section; Figure 2 is a sectional view through the assembly, being taken on the line 2—2 of Figure 1; Figure 3 is a sectional view taken on the line 3—3 of Figure 2, showing details of the top fluid motor and associated parts; Figure 4 is a sectional view taken on the line 4—4 of Figure 1 showing details of the bottom fluid motor and associated parts; and Figures 5 and 6 are sectional views taken on the lines 5—5 and 6—6, respectively, of Figure 1 and showing details of the anchor arrangements of the shoes.

Referring to the drawings in detail and first to Figure 1, the brake assembly embodying my invention is provided with the usual drum 1 secured to the rotating member to be braked, such as the wheel of the vehicle, and 2 the backing plate for enclosing the open side of the drum, said backing plate being secured to a fixed member such as an axle housing and constituting a support for the brake shoes and actuating means. Within the drum are two shoes 3 and 4 for cooperation with the cylindrical surface of the drum, said shoes being provided with linings 5 and 6, respectively. The backing plate carries an anchor pin 7 for the upper end of brake shoe 3 and an anchor pin 8 for the lower end of brake shoe 4. The upper end of brake shoe 4 is adapted to be actuated by a fluid motor, generally indicated by the numeral 9, said motor being carried by the backing plate and also arranged so that under certain conditions the upper end of shoe 4 can anchor thereon. The lower adjacent ends of brake shoes 3 and 4 are adapted to be actuated by a second fluid motor 10 of the "floating" type.

The brake shoes 3 and 4 are of similar construction and are of the "self-centering" type, as disclosed and claimed in Schnell Patent No. 2,331,349, issued October 12, 1943. These shoes are arranged to be self-energizing when the drum rotates in the forward direction as indicated by the arrow and are automatically adjustable to permit the shoes to centralize themselves in the drum.

As shown in Figures 1 and 5, the brake shoe 3 is provided at its upper end with a curved end surface 11 which cooperates with a like curved surface 12 on a block 13 pivotally mounted on anchor pin 7. The anchor pin also has pivotally mounted thereon plates 14 and 15 positioned on opposite sides of the shoe and the block and extending along side the web portion 16 of the shoe. The ends of these links are connected together by means of a pivot pin 17 which extends through a slot 18 in the web, said slot being of a width to snugly receive the pin and of a length to permit relative movement between the shoe and the links. The axis of the pivot pin is the center of the curved surfaces 11 and 12 on the end of the shoe and the block, respectively. The block 13 and the plates are secured together so that the plates and the block must rotate as a unit about anchor pin 7. It is seen that with this construction the end of the shoe can move about the pivot pin 17 relatively to block 13 and when any such movement takes place, surfaces 11 and 12 will remain in full contact since their centers coincide with the axis about which the shoe must move relatively to the block. The end of the shoe is cut away to receive a spring 19 and between this spring and the pin there is provided a plunger 19' whereby the spring can act between the pin and the brake shoe. Since the pin is carried by the plates which are pivoted on the anchor, the force of the spring will act to force the shoe end curved surface 11 into tight frictional engagement with the curved surface 12 on the block. This force is such that considerable pressure is necessary to cause a relative sliding movement between the curved surfaces.

When the lower unanchored end of shoe 3 is moved toward the drum, it will pivot about the anchor pin. There will be no sliding movement between the curved surfaces 11 and 12. However, if there is drum expansion or distortion due to "toe grab," the heel end of the shoe will follow the drum outwardly. If the outward movement is due to "toe grab," such movement will relieve it. To do this the shoe will have slight rotative movement about pin 17. This will make an adjustment and such will be maintained due to the action of spring 19. However, when the drum contracts or the distortion is relieved, there will be a re-adjustment and the shoe heels will return to their normal positions with respect to the anchor pin block.

The lower end of brake shoe 4 is provided with a curved end surface 20 which cooperates with a like curved surface 21 on a block 22 pivotally mounted on anchor pin 8. The block has secured thereto plates 23 and 24 on opposite sides thereof which extend along the sides of web 25. These plates carry a pin 26 which extends through a slot 27 in the shoe web. A spring 28 and a plunger 29 are carried by the shoe and act to apply force to the shoe holding the curved surfaces 20 and 21 in tight frictional engagement. Adjustment between the shoe and the block takes place in the same manner as already described in connection with the like mounting of brake shoe 3. The block 22 does not entirely surround anchor pin 8 as it has a cut-out 30 to permit the block to move away from the anchor pin. Similarly, plates 23 and 24 are also cut away, as indicated at 31 and 32, to permit them to move with the block away from the anchor pin. This construction will permit the lower end of shoe 4 to be operated into engagement with the drum and to act as an energizing shoe when the drum is rotating in the direction opposite that indicated by the arrow.

The fluid motor 9, which is employed to actuate the upper end of brake shoe 4, is shown in detail in Figure 3 and comprises a cylinder 33 secured to the backing plate by bolts 34. This cylinder is provided with a closure wall 35 at its end adjacent the anchor pin 7. Within the cylinder is a piston 36 carrying an annular packing cup 37 for sealing the piston. Between this cup and the end wall 35 is a fluid receiving chamber 38 which is connected to a suitable source of fluid pressure, such as a master cylinder device, by way of a conduit 39. The chamber also has a bleed passage 40 which is controlled by a bleeder screw 41. The piston is connected to the end of brake shoe 4 by an adjustable connecting means 42 which comprises an externally threaded link 43 pivotally connected to the shoe and a cylindrical link 44 having internal threads for cooperation with the threads of link 43. This cylindrical link 44 has a spherical closed end for cooperation with the piston. Carried on link 44 is a toothed member 45 with which a gear 46 cooperates, said gear being mounted upon a shaft 47 which extends to the exterior of the backing plate. The gear and shaft are supported by an L-shaped bracket 48. By turning gear 46, the cylindrical link can be rotated relatively to link 43 and an adjustment made. The open end of the cylinder is closed by a cover 48'. The piston is adapted to abut the end wall 34 of the cylinder when in its "off" position and because of this construction, the cylinder will act as an anchor for brake shoe 4 when the lower end of the brake shoe is actuated into engagement with the drum and the drum is rotating in the direction opposite that indicated by the arrow. When the drum is rotating in the direction indicated by the arrow, the brake shoe will anchor on anchor pin 8 and be actuated into the drum by fluid under pressure causing piston 36 to move in the cylinder.

The fluid motor 10 at the bottom of the brake comprises a cylinder 49 having an end wall 50 provided with a projection 51 extending into the cylinder, said projection having a bore 52 opening to the exterior. Within the cylinder is a piston 53 having a sealing cup 54. The face of the piston is provided with a bore 55 so as to receive projection 51. The piston abuts the end 50 of the cylinder when in its innermost position. An adjustable piston rod 56 connects piston 53 with block 22 mounted upon anchor pin 8 and associated with the lower end of brake shoe 4. A pin 57 fastens the rod to the block. The open end of cylinder 49 is closed by a closure cup 58. The cylinder 49 is adapted to be supported in a "floating" manner on the backing plate. This is accomplished by providing the cylinder with a projection 59 extending through a slot 60 in the backing plate. The projection is held in the slot by a washer 61 and a locking ring 62.

The cylinder is connected to actuate the lower end of the brake shoe 3 by an adjustable connection generally indicated by the numeral 63. This connection comprises an externally threaded link 64 pivotally connected to shoe 3 by a pin 65. Threaded on the link is a member 66 having a cylindrical portion 67 received in the bore 52 of the cylinder end wall. Member 66 is provided with teeth 68 which have cooperating therewith a gear 69 carried by a shaft 70 which extends to the exterior of the casing. Gear 69 is supported and held in mesh with teeth 68 by an L-shaped bracket 71. By turning gear 69, member 66 can be rotated relatively to link 64 and thus the length of the connecting means changed as desired. When fluid pressure is forced into chamber 72 between the piston and the end wall of the cylinder, the cylinder and piston will be moved relatively and consequently shoe 3 will be actuated as a result of the cylinder engaging member 66 and transmitting force through the connecting means 63. Chamber 72 in the cylinder is connected by a conduit 73 to chamber 38 of the upper fluid motor. In the event this conduit is made of copper or some other rigid piping, it is provided with a yieldable portion 74 so that the relative movement of the lower cylinder with respect to the copper cylinder can be permitted without strain on the pipe. Since the upper fluid motor receives fluid under pressure from a suitable source, it is seen that whenever fluid under pressure enters the upper fluid motor, it will also be conveyed to the lower fluid motor.

The brake shoes are provided with suitable retracting springs in order to maintain them in "off" position with respect to the drum when the fluid motors are not being actuated. A retracting spring 75 is connected to the upper end of shoe 4 and to a pin 76 carried by extensions on plates 14 and 15 associated with shoe 3. This spring maintains piston 36 in engagement with the end wall 35 of the cylinder of the fluid motor. By adjusting the length of the connecting means 42, the proper "off" position clearance of the upper end of brake shoe 4 can be obtained. A retracting spring 77 is connected to the lower end of brake shoe 4 and to a pin 78 carried by extensions on plates 23 and 24 associated with the lower end of shoe 4. The retracting spring 78 maintains block 22 normally engaged with anchor pin 8.

The positions of the parts of the brake assembly when the brake is released are as shown in Figure 1. If the drum is rotating in the direction indicated by the arrow (forward directiton) and fluid under pressure is forced into fluid motors 9 and 10, the upper end of brake shoe 4 will be forced outwardly into engagement with the drum and the lower end of brake shoe 3 will be forced outwardly into engagement with the drum. Shoe 4 will anchor on anchor pin 8 and shoe 3 will anchor on pin 7. The operation of fluid motor 10 will not cause block 22 to be moved away from anchor pin 8 since the forces acting on the shoe to hold this block in engagement with the anchor pin (these forces being the force applied by fluid motor 9 and the force resulting from the shoe being acted upon by the rotating drum) are greater than the force of the fluid motor 10 tending to push the block away from the anchor pin. Both shoes operate as self-energizing or "forward" shoes since they are anchored at their ends remote from the "forward" end where the input force is being applied. Consequently, the brake will produce maximum braking action. The particular mounting of the brake shoes will insure that the shoes will remain self-centered under all conditions. When the shoes are being moved in and out of engagement with the drum, there will be no sliding movement at the curved surfaces.

When the drum is rotating in the direction opposite that indicated by the arrow and fluid under pressure is forced into the fluid motors, both brake shoes will be applied to the drum and brake shoe 4 will anchor on the backing plate through cylinder 33 of fluid motor 9 and brake shoe 3 will anchor on the backing plate through anchor pin 7. The lower ends of both shoes will be moved outwardly into engagement with the drum by the operation of the fluid motor 10 since this fluid motor is of the "floating" type. When fluid under pressure enters chamber 72, the piston and cylinder will be moved apart and force will be applied to the lower end of shoe 3 and to block 22. The force transmitted to the block will be transmitted to brake shoe 4 and both the brake shoe and the block will move bodily away from anchor pin 8. It is thus seen that shoe 4 will again act as a self-energizing or "forward" shoe but the shoe 3 will act as a de-energized or "reverse" shoe since it is anchored at the "forward" end with respect to the direction of rotation of the drum. The fluid under pressure which enters chamber 38 in fluid motor 9 will not move piston 36 in the cylinder since this fluid pressure force is less than the force of the fluid pressure transmitted to the shoe by fluid motor 10 plus the force resulting from the drag of the rotating drum on the shoe.

From the foregoing description it is seen that a brake assembly has been provided which will give very efficient braking characteristics. When the drum is rotating in the "forward" direction (direction of arrow) both shoes will act as self-energized or "forward" shoes and consequently the brake will produce a maximum braking action. In the opposite direction of rotation the shoe will act as an ordinary two-shoe brake since the shoes are pivoted at one pair of adjacent ends and actuated at the other pair of adjacent ends. Since this direction of rotation of the drum is generally the "reverse" rotation of the rotating members or wheels to be braked and a maximum braking action is not required under such conditions, the resulting braking action will be sufficient for all purposes. The anchored ends of the brake shoe for the forward direction of rotation of the drum, that is, the direction of the arrow, are arranged to be self-centering and the arrangement with respect to the one shoe which acts as a self-energized shoe in both directions of rotation is such that the self-centered position will not be changed when the shoe is actuated into engagement with the drum and released therefrom. The only adjustments required to be made during the life of the brake linings is that of the two connecting means 42 and 63 and these adjustments can be made conveniently from the exterior of the brake by a simple tool.

Being aware of the possibility of modification in the particular structure herein described without departing from the fundamental principles of my invention, I do not intend that its scope be limited except as set forth by the appended claims.

Having fully described my invention, what I claim as new and desire to secure by Letters Patent of the United States is:

1. In braking mechanism, a support, a brake drum, a brake shoe for engaging the drum, an anchor pin carried by the support adjacent one end of the shoe for anchoring said shoe when the direction of drum rotation tends to drag said shoe toward the anchor pin, means associated with the anchor pin and said shoe end for permitting movement of the shoe outwardly toward the drum and relatively to the anchor pin to cause said shoe to be adjusted relative to said drum, anchor means for the other end of the shoe when the direction of drum rotation tends to drag said shoe toward said other end, means for moving the first named shoe end and said first named means bodily relatively to the anchor pin to cause the shoe to be applied to the drum, and means for actuating said other shoe end, one of said last two mentioned means being fixed to said support and the other being floatingly associated with said support.

2. In braking mechanism, a support, a brake drum, a brake shoe for engaging the drum, an anchor carried by the support adjacent one end of the shoe, a member pivotally associated with the anchor, means for actuating the other end of the shoe, said member and the shoe being so controlled and arranged with each other such that the shoe will by means of said member pivot relative to the anchor when caused to engage the drum with said drum rotating in the direction toward the anchor from the actuated end, such relative movement with respect to the member adjusting said shoe relative to said drum, means for anchoring said other end of the shoe, and means for actuating the shoe and member bodily toward the drum and away from the anchor with which the member pivots, one of said last two mentioned means being fixed to said support and the other being floatingly associated with said support.

3. In braking mechanism, a support, a brake drum, a brake shoe for engaging the drum, an anchor pin carried by the support adjacent one end of the shoe, a block pivotally associated with the anchor pin but capable of movement relative thereto, said block and shoe having abutting complementary surfaces, spring means for holding the surfaces in frictional engagement to cause the shoe and block to pivot bodily about the anchor pin when the direction of drum rotation causes the shoe to anchor on the anchor pin while it is actuated at the other end to engage the drum, said spring means permitting relative movement of the shoe with respect to the block for automatic centering of the shoe, means for actuating the other end of the shoe, anchor means for the other end of the shoe when there is opposite drum rotation, and means for actuating the first end, said last named means applying force to the block for causing said block and shoe to move bodily away from the anchor pin, one of said actuating means being fixed to said support and the other being floatingly associated with said support.

4. In braking mechanism, a support, a brake drum, an anchor pin carried by the support, a brake shoe for engaging the drum, a member pivotally associated with the anchor pin and capable of relative movement thereto, means for maintaining said member in engagement with said anchor pin, said member and one end of the shoe being provided with like curved abutting surfaces, actuating means for causing said pivoted member to be rotated with the shoe when actuated at the other end but permitting relative sliding movement between the surfaces to take place when the shoe is engaged with the drum and moves outwardly as a result of drum change, means for actuating the other end of the shoe, means for anchoring said other end, and actuating means for applying force to the first named end of the shoe through said member which is pivotally associated with the anchor pin, one of said actuating means being fixed to said support and the other being floatingly associated with said support.

5. In braking mechanism, a support, a brake drum, an anchor pin carried by the support, a brake shoe for engaging the drum, a member pivotally associated with the anchor pin and capable of relative movement thereto, means for maintaining said member in engagement with said anchor pin, said member and one end of the shoe being provided with like curved abutting surfaces, an element rigidly secured to the member and pivotally connected to the shoe, the axis of said pivotal connection coinciding with that of the abutting curved surfaces, spring means for holding the curved surfaces in frictional engagement, actuating means for the other end of the shoe, means for anchoring said other end, and actuating means for applying force to the first named end of the shoe through said member which is pivotally associated with the anchor pin, one of said actuating means being fixed to said support and the other floatingly associated with said support.

6. In braking mechanism, a support, a brake drum, a brake shoe for engaging the drum, an anchor carried by the support adjacent one end of the shoe, a member pivotally associated with the anchor, a fluid motor for actuating the other end of the shoe, said member and the shoe being so arranged and associated with each other such that the shoe will by means of said member pivot about the anchor when caused to engage the drum with said drum rotating in the direction toward the anchor from the actuated end but is capable of relative movement with respect to the member to automatically make an adjustment, means including said motor for anchoring said other end of the shoe, means for adjusting the released position of said other end of the shoe, a fluid motor for actuating the shoe and member bodily toward the drum and away from the anchor associated with the member, and means for placing the fluid motors in communication with each other, one of said motors being fixed to said support and the other floatingly arranged on said support.

7. In braking mechanism, a support, a brake drum, two brake shoes arranged in end-to-end relation in the drum, two diametrically arranged anchor pins carried by the support one for each shoe, a block pivotally associated with each anchor and having an abutment surface engaged by a shoe end, means for maintaining each shoe in frictional engagement with the block so that the shoe and block will be capable of bodily pivoting about the anchor pin with which the block is associated, said last mentioned means permitting the shoe to move relatively to the block to make an automatic adjustment, means for actuating the end of one of the shoes remote from its anchor pin, means for anchoring said actuated end, and means for applying a spreading pressure between the end of the other shoe remote from its anchor pin and the block associated with the adjacent end of the first named shoe, said last named block being arranged to move away from its anchor pin, one of said second and third last mentioned means being fixed to said support and the other floatingly associated with said support.

8. In braking mechanism, a support, a brake drum, two brake shoes arranged in end-to-end relation in the drum, two diametrically arranged anchor pins carried by the support one for each shoe, a block pivotally associated with each anchor and having an abutment surface engaged by a shoe end, means for maintaining each shoe in frictional engagement with the block so that the shoe and block will be capable of bodily pivoting about the anchor pin with which the block is associated but the shoe will be permitted to move relatively to the block to make an automatic adjustment, a fluid motor fixed to and carried by the support and connected to actuate the end of one of the shoes remote from its anchor pin, means for anchoring said actuated end, a floating fluid motor connected to apply pressure to the end of the other shoe remote from its anchor pin and the block associated with the adjacent end of the first named shoe, said last named block being arranged to move away from its anchor pin, and means for placing the fluid motors in communication with each other.

9. In braking mechanism, a support, a brake drum, two brake shoes arranged in end-to-end relation in the drum, two diametrically arranged anchor pins carried by the support one for each shoe, a block pivotally associated with each anchor and having an abutment surface engaged by a shoe end, means for maintaining each shoe in frictional engagement with the block so that the shoe and block will be capable of bodily pivoting about the anchor pin with which the block is associated but the shoe will be permitted to move relatively to the block to make an automatic adjustment, a fluid motor carried by the support and comprising a fixed cylinder and a movable piston, an adjustable connection between the piston and the end of one of the shoes remote from its anchor pin, said piston being arranged to engage the cylinder to thereby constitute an anchor for the actuated shoe end under conditions where the drum is rotating in a direction to drag the shoe toward the fluid motor, a floating fluid motor, an adjustable connection between the floating motor and the end of the other shoe remote from its anchor pin, a connection between the floating motor and the block associated with the adjacent end of the first named shoe, said last named block being arranged to move away from its anchor pin, and means for placing the fluid motors in communication with each other.

CLARENCE J. WHITACRE.